US010760682B2

(12) United States Patent
Tsukizaki et al.

(10) Patent No.: US 10,760,682 B2
(45) Date of Patent: Sep. 1, 2020

(54) ELECTRICALLY DRIVEN VEHICLE START CONTROL DEVICE

(71) Applicant: Nissan Motor Co., Ltd., Yokohama-shi, Kanagawa (JP)

(72) Inventors: Atsushi Tsukizaki, Kanagawa (JP);
Masato Koga, Kanagawa (JP);
Hiroyuki Fukuda, Kanagawa (JP);
Ryohey Toyota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 466 days.

(21) Appl. No.: 15/560,563

(22) PCT Filed: Apr. 14, 2015

(86) PCT No.: PCT/JP2015/061469
§ 371 (c)(1),
(2) Date: Sep. 22, 2017

(87) PCT Pub. No.: WO2016/166814
PCT Pub. Date: Oct. 20, 2016

(65) Prior Publication Data
US 2018/0106365 A1    Apr. 19, 2018

(51) Int. Cl.
*F16H 61/02*    (2006.01)
*B60K 6/36*    (2007.10)
(Continued)

(52) U.S. Cl.
CPC .......... *F16H 61/0213* (2013.01); *B60K 6/36* (2013.01); *B60K 6/38* (2013.01); *B60K 17/02* (2013.01);
(Continued)

(58) Field of Classification Search
CPC .. F16H 59/68; F16H 61/0213; F16H 61/0403; F16H 2059/446; F16H 2061/023;
(Continued)

(56) References Cited

U.S. PATENT DOCUMENTS 9,346,372 B2    5/2016 Kurita et al.
2006/0195243 A1*    8/2006 Suzuki ................ F16H 61/0437
701/51
(Continued)

FOREIGN PATENT DOCUMENTS

EP    2 388 497 A1    11/2011
JP    6-245329 A    9/1994
(Continued)

*Primary Examiner* — Edwin A Young
(74) *Attorney, Agent, or Firm* — Global IP Counselors, LLP

(57) ABSTRACT

A drive system is provided with a first motor generator as a power source, and a multistage gear transmission for changing the speed of output from the first motor generator and transmitting the output to drive wheels. The multistage gear transmission has a plurality of engagement clutches as shifting elements that are meshingly engaged upon movement from a disengaged position. This hybrid vehicle is provided with a start control device where, when a start clutch has been engaged while the vehicle is stopped, the start control device maintains the engagement of the start clutch for a duration that includes when the vehicle is stopped and until the next vehicle start.

14 Claims, 9 Drawing Sheets

(51) Int. Cl.
*B60K 6/38* (2007.10)
*B60K 17/02* (2006.01)
*B60K 17/06* (2006.01)
*F16H 59/68* (2006.01)
*F16H 61/04* (2006.01)
*F16H 59/44* (2006.01)

(52) U.S. Cl.
CPC ............. *B60K 17/06* (2013.01); *F16H 59/68* (2013.01); *F16H 61/0403* (2013.01); *B60Y 2200/91* (2013.01); *B60Y 2200/92* (2013.01); *F16H 2059/446* (2013.01); *F16H 2061/023* (2013.01); *F16H 2061/047* (2013.01); *F16H 2061/0407* (2013.01); *F16H 2200/0021* (2013.01); *F16H 2312/02* (2013.01); *F16H 2312/14* (2013.01); *Y02T 10/7258* (2013.01)

(58) Field of Classification Search
CPC ......... F16H 2061/0407; F16H 2312/02; F16H 2312/14
See application file for complete search history.

(56) References Cited

U.S. PATENT DOCUMENTS

| | | | |
|---|---|---|---|
| 2011/0287884 A1* | 11/2011 | Unno | F16H 61/0059 475/140 |
| 2014/0046525 A1 | 2/2014 | Lee et al. | |
| 2015/0298576 A1* | 10/2015 | Kurita | B60T 7/12 701/22 |

FOREIGN PATENT DOCUMENTS

| JP | 2006-7968 A | 1/2006 |
|---|---|---|
| KR | 10-2014-0021220 A | 2/2014 |
| WO | 2014/103572 A1 | 7/2014 |

\* cited by examiner

GEAR SHIFT PATTERN

| C2 | C3 | C1 | | |
|---|---|---|---|---|
| | | Left | N | Right |
| N | N | EV – ICEgen | Neutral | EV – ICE 3rd |
| | Left | EV 1st ICE 1st | EV 1st ICE – | EV 1st ICE 3rd |
| | | Lock | EV 1st ICE 2nd | Lock |
| Left | N | EV 1.5 ICE 2nd | EV – ICE 2nd | Lock |
| | | Lock | EV 2nd ICE 2nd | Lock |
| | Right | EV 2nd ICE 3rd' | EV 2nd ICE – | EV 2nd ICE 3rd |
| N | | Lock | EV 2nd ICE 4th | Lock |
| Right | N | EV 2.5 ICE 4th | EV – ICE 4th | Lock |
| | Left | Lock | EV 1st ICE 4th | Lock |

ELECTRICALLY DRIVEN VEHICLE START CONTROL DEVICE

CROSS-REFERENCE TO RELATED APPLICATIONS

This application is a U.S. National stage application of International Application No. PCT/JP2015/061469, filed Apr. 14, 2015.

BACKGROUND

Field of the Invention

The present invention generally relates to a device for controlling the starting of an electrically driven vehicle, in which a drive system from an electric motor is provided with a transmission, and the transmission has, as shifting elements, engagement clutches that meshingly engage by movement from a disengaged position.

Background Information

Conventionally, a device is known in which, at the time of a selection operation to the starting gear to engage a dog clutch, the electric motor is driven for a moment and the rotation thereof is transmitted to a transmission input shaft, to make it possible to switch the transmission from the neutral position to the starting gear selection position (for example, refer to Patent Document 1—Japanese Laid-Open Patent Application No. Hei 6(1994)-245329).

SUMMARY

However, in the conventional device, even when trying to switch from the neutral position to the starting gear selection position by engaging a hydraulically operated dog clutch, as in the case of an automatic transmission, the electric motor is stopped and the hydraulic pressure generating pump is also stopped, when the vehicle is stopped. Consequently, there is the problem that a starting gear selection state cannot be achieved until the time of the next starting operation, when the accelerator pedal is depressed and the electric motor is activated, and thus, starting shock and start delay cannot be avoided.

In view of the problems described above, an object of the present invention is to provide a device for controlling the starting of an electrically driven vehicle, in which vehicle starting with a good response to a starting request is achieved, while suppressing starting shock when there is a starting request.

In order to achieve the object above, the electrically driven vehicle of the present invention comprises, in a drive system, an electric motor as a power source, and a transmission that changes the speed of the output from the electric motor and transmits the output to the drive wheels. The transmission has a plurality of engagement clutches as shifting elements that meshingly engage by movement from a disengaged position. In this electrically driven vehicle, assuming that, among the plurality of engagement clutches, the clutch that is meshingly engaged upon a starting request is called a start clutch, a starting controller is provided, which maintains the engagement of the start clutch for a duration that includes the vehicle being stopped and until the next starting, if the start clutch is engaged when the vehicle is stopped. The transmission has starting gear shift stages in which the start clutch is engaged. When there is a selection operation from a traveling range to a parking range or a neutral range in a vehicle stopped state, the starting controller maintains the starting gear shift stage until the next time that the traveling range is selected.

Therefore, if the start clutch is engaged when the vehicle is stopped, the engagement of the start clutch is maintained for a duration that includes when the vehicle is stopped and until the next starting. That is, when the start clutch is an engagement clutch, if the phases of the teeth are matched, it is not possible to move in the engaging direction, and it is necessary to cause an engagement after shifting the phases, which requires time. In contrast, since the start clutch is engaged in advance, if there is a starting request from a vehicle in a stopped state, the engagement operation of the start clutch, which is meshed and engaged, becomes unnecessary; therefore, starting shock is suppressed and the time required from a starting request to the vehicle starting is reduced. As a result, it is possible to achieve vehicle starting with a good response to a starting request, while suppressing the starting shock when there is a starting request.

BRIEF DESCRIPTION OF THE DRAWINGS

Referring now to the drawings, a vehicle with a starting control device is illustrated.

FIG. 4 is a gear shift pattern chart illustrating the gear shift patterns according to the switching positions of three engagement clutches in a multistage gear transmission mounted on a hybrid vehicle to which is applied the starting control device of the first embodiment.

DETAILED DESCRIPTION OF THE EMBODIMENTS

Figure 1:
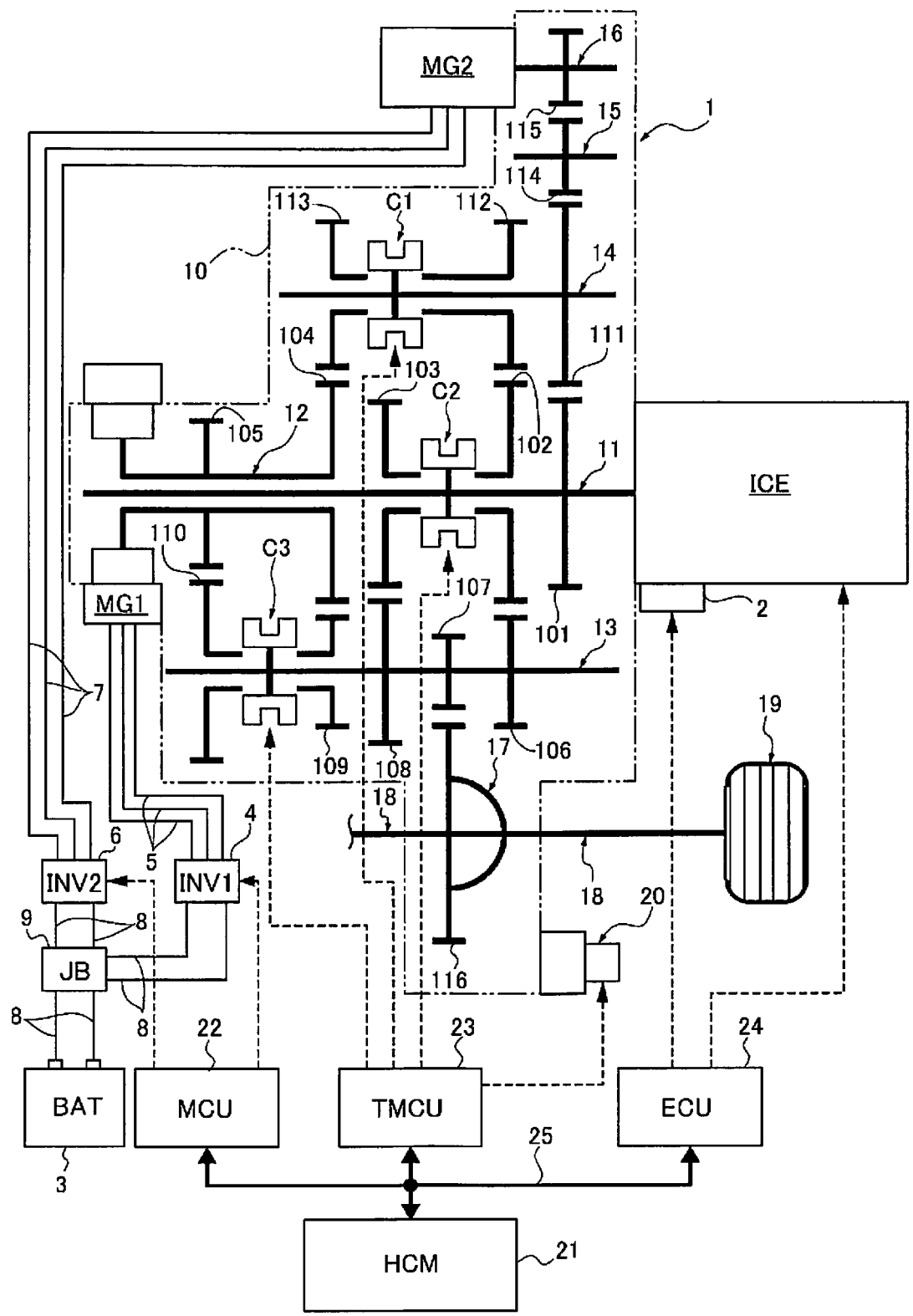
FIG. 1 is an overall system view illustrating a drive system and a control system of a hybrid vehicle to which is applied the starting control device of a first embodiment.

Preferred embodiments for realizing the device for controlling the starting of an electrically driven vehicle according to the present invention is described below, based on the first and second embodiments illustrated in the drawings.

First Embodiment

The configuration is described first. The starting control device of the first embodiment is applied to a hybrid vehicle (one example of an electrically driven vehicle) comprising, as drive system components, one engine, two motor/generators, and a multistage gear transmission having three engagement clutches. The "overall system configuration," the "configuration of the shift control system," the "configuration of the gear shift patterns," and the "configuration of the starting control process" will be separately described below, regarding the configuration of the device for controlling starting of a hybrid vehicle in the first embodiment.

Overall System Configuration

FIG. 1 illustrates a drive system and a control system of a hybrid vehicle to which is applied the starting control device of the first embodiment. The overall system configuration will be described below, based on FIG. 1.

The drive system of the hybrid vehicle comprises an internal combustion engine ICE, a first motor/generator MG1, a second motor/generator MG2, and a multistage gear transmission 1 having three engagement clutches C1, C2 and C3, as illustrated in FIG. 1. "ICE" is an abbreviation for "Internal Combustion Engine."

The internal combustion engine ICE is, for example, a gasoline engine or a diesel engine that is disposed in a front compartment of a vehicle such that the crankshaft direction is in the vehicle width direction. This internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, where the second motor/generator MG2 is used as a starter motor. However, a starter motor 2 is left in preparation for when an MG2 start using a high power battery 3 cannot be ensured, such as during extreme cold.

Both the first motor/generator MG1 and the second motor/generator MG2 are permanent magnet-type synchronous motors utilizing three-phase alternating current, having the high power battery 3 as a common power source. The stator of the first motor/generator MG1 is fixed to a case of the first motor/generator MG1, and the case is fixed to the transmission case 10 of the multistage gear transmission 1. Then, a first motor shaft integrated to a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated to a rotor of the second motor/generator MG2 is connected to a sixth shaft 16 of the multistage gear transmission 1. A first inverter 4, which converts direct current to three-phase alternating current during powering and converts three-phase alternating current to direct current during regeneration, is connected to a stator coil of the first motor/generator MG1, via a first AC harness 5. A second inverter 6, which converts direct current to three-phase alternating current during powering and converts three-phase alternating current to direct current during regeneration, is connected to a stator coil of the second motor/generator MG2, via a second AC harness 7. The high power battery 3, the first inverter 4, and the second inverter 6 are connected by a DC harness 8, via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2 and C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided. The transmission case 10 is provided with an electric oil pump 20 that supplies lubrication oil to the meshing portions of the gears and the axle bearing portions inside the case.

The first shaft 11 is the shaft to which the internal combustion engine ICE is connected, and a first gear 101, a second gear 102, and a third gear 103 are disposed to the first shaft 11, in order from the right side in FIG. 1. The first gear 101 is integrally provided (including integral fixing) on the first shaft 11. The second gear 102 and the third gear 103 are idling gears, in which boss portions that protrude in the axial direction are inserted onto the first shaft 11, and are provided so as to be drivably connectable to the first shaft 11 via the second engagement clutch C2.

The second shaft 12 is a shaft to which the first motor/generator MG1 is connected, and is a cylindrical shaft coaxially disposed with the axis aligned with the outer side position of the first shaft 11, with a fourth gear 104 and a fifth gear 105 disposed on the second shaft 12, in order from the right side in FIG. 1. The fourth gear 104 and the fifth gear 105 are integrally provided (including integral fixing) on the second shaft 12.

The third shaft 13 is disposed on the output side of the multistage gear transmission 1, and a sixth gear 106, a seventh gear 107, an eighth gear 108, a ninth gear 109, and a tenth gear 110 are disposed on the third shaft 13, in order from the right side in FIG. 1. The sixth gear 106, the seventh gear 107, and the eighth gear 108 are integrally provided (including integral fixing) on the third shaft 13. The ninth gear 109 and the tenth gear 110 are idling gears, in which boss portions that protrude in the axial direction are inserted onto the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 has both ends supported on the transmission case 10, and an eleventh gear 111, a twelfth gear 112, and a thirteenth gear 113 are disposed to the fourth shaft 14, in order from the right side in FIG. 1. The eleventh gear 111 is integrally provided (including integral fixing) on the fourth shaft 14. The twelfth gear 112 and the thirteenth gear 113 are idling gears, in which boss portions protruding in axial directions are inserted onto the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12. The fifth shaft 15 has both ends supported on the transmission case 10, and a fourteenth gear 114 that meshes with the eleventh gear 111 of the fourth shaft 14 is integrally provided thereto (including integral fixing). The sixth shaft 16 is connected to the second motor/generator MG2, and a fifteenth gear 115 that meshes with the fourteenth gear 114 of the fifth shaft 15 is integrally provided thereto (including integral fixing). Then, the second motor/generator MG2 and the internal combustion engine ICE are mechanically connected to each other by a gear train configured from the fifteenth gear 115, the fourteenth gear 114, the eleventh gear 111, and the first gear 101, which mesh with each other. This gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2, by the driving of the internal combustion engine ICE.

The first engagement clutch C1 is a dog clutch interposed between the twelfth gear 112 and the thirteenth gear 113 of the fourth shaft 14, and is engaged by an engagement movement in a rotation synchronization state, by not having a synchronizing mechanism. When the first engagement clutch C1 is in a left engagement position (Left), the fourth shaft 14 and the thirteenth gear 113 are drivingly connected. When the first engagement clutch C1 is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 is a dog clutch interposed between the second gear 102 and the third gear 103 of the first shaft 11, and is engaged by an engagement movement in a rotation synchronization state, by not having a synchronizing mechanism. When the second engagement clutch C2 is in a left engagement position (Left), first shaft 11 and the third gear 103 are drivingly connected. When the second engagement clutch C2 is in a neutral position (N), the first shaft 11 and the second gear 102 are released, and the first shaft 11 and the third gear 103 are released. When the second engagement clutch C2 is in a right engagement position (Right), first shaft 11 and the second gear 102 are drivingly connected.

The third engagement clutch C3 is a dog clutch interposed between the ninth gear 109 and the tenth gear 110 of the third shaft 13, and is engaged by an engagement movement in a rotation synchronization state, by not having a synchronizing mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivingly connected. Then, a sixteenth gear 116 that meshes with the seventh gear 107 integrally provided (including integral fixing) on the third shaft 13 of the multistage gear transmission 1 is connected to left and right drive wheels 19 via the differential gear 17, and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (abbreviation: "HCM") is an integrated control means to appropriately manage the energy consumption of the entire vehicle. The hybrid control module 21 is connected to the other control units (motor control unit 22, transmission control unit 23, engine control unit 24, etc.) so as to be capable of bidirectional information exchange by a CAN communication line 25. The "CAN" in CAN communication line 25 is an abbreviation for "Controller Area Network."

The motor control unit 22 (abbreviation: "MCU") carries out powering control, regeneration control, and the like, of the first motor/generator MG1 and the second motor/generator MG2, by control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target drive force is determined. In the "rotational speed FB control," a control is carried out in which a target motor rotation speed, with which the input/output rotational speeds of the clutch are synchronized, is determined, and an FB torque is output so as to converge the actual motor rotation speed to the target motor rotation speed, when there is a gear shift request to meshingly engage any one of the engagement clutches C1, C2, or C3 during traveling.

The transmission control unit 23 (abbreviation: "TMCU") carries out a shift control for switching the gear shift pattern of the multistage gear transmission 1, by outputting a current command to electric actuators 31, 32, and 33 (refer to FIG. 2), based on predetermined input information. In this shift control, the engagement clutches C1, C2 and C3 are selectively mesh engaged/released, and a gear pair involved in power transmission is selected from the plurality of gear pairs. Here, at the time of a gear shift request to engage any one of the released engagement clutches C1, C2, or C3, in order to suppress differential rotation speed between the input/output of the clutch to ensure a meshing engagement, a rotational speed FB control (rotation synchronization control) of the first motor/generator MG1 or the second motor/generator MG2 is used in combination.

The engine control unit 24 (abbreviation: "ECU") carries out start control of the internal combustion engine ICE, stop control of the internal combustion engine ICE, fuel cut control, and the like, by outputting a control command to the motor control unit 22, a spark plug, a fuel injection actuator, or the like, based on predetermined input information.

Configuration of the Shift Control System

The multistage gear transmission 1 according to a first embodiment is characterized in that efficiency is achieved by reducing drag by employing, as shifting elements, engagement clutches C1, C2 and C3 (dog clutch) that are meshed and engaged. Then, when there is a gear shift request to meshingly engage any one of the engagement clutches C1, C2, or C3, the differential rotation speeds of the input/output of the clutch are synchronized by the first motor/generator MG1 (when the engagement clutch C3 is engaged) or the second motor/generator MG2 (when the engagement clutches C1, C2 are engaged), and an engagement stroke is started once the rotational speed falls within a synchronization determination rotational speed range, to realize the gear shift. In addition, when there is a gear shift request to release any one of the engaged engagement clutches C1, C2, or C3, the clutch transmission torque of the release clutch is reduced, and a disengagement stroke is started once the torque becomes equal to or less than a release torque determination value, to realize the gear shift. The configuration of the shift control system of the multistage gear transmission 1 is described below based on FIG. 2.

Figure 2:
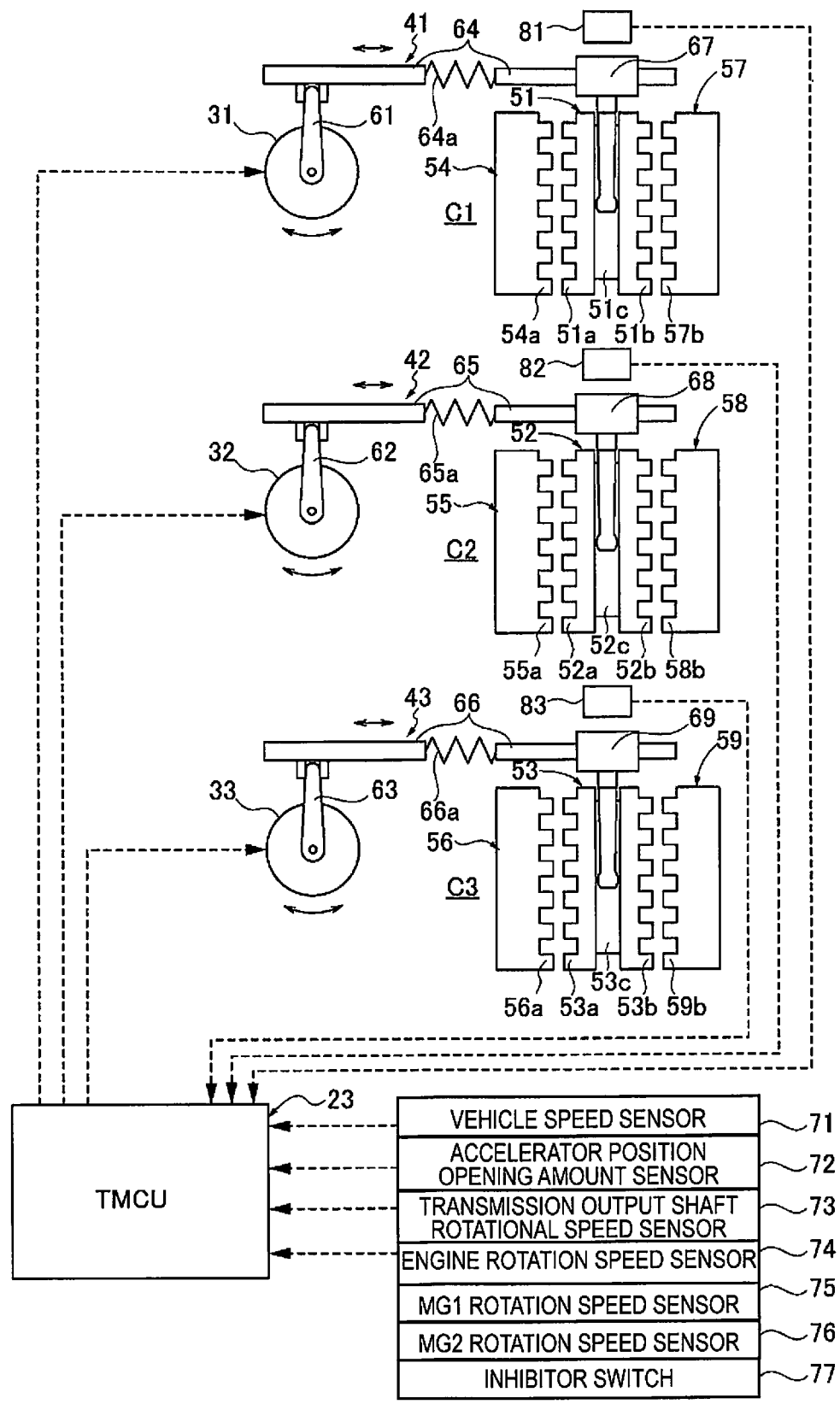
FIG. 2 is a control system block diagram illustrating the configuration of a shift control system for a multistage gear transmission mounted on a hybrid vehicle to which is applied the starting control device of the first embodiment.

The shift control system comprises, as engagement clutches, a first engagement clutch C1, a second engagement clutch C2, and a third engagement clutch C3, as illustrated in FIG. 2. A first electric actuator 31, a second electric actuator 32, and a third electric actuator 33 are provided. A first engagement clutch operating mechanism 41, a second engagement clutch operating mechanism 42, and a third engagement clutch operating mechanism 43 are provided as mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position); a left engagement position (Left: left side clutch meshing engagement position); and a right engagement position (Right: right side clutch meshing engagement position). The engagement clutches C1, C2 and C3 all have the same configuration, comprising coupling sleeves 51, 52, and 53; left dog clutch rings 54, 55, and 56; and right dog clutch rings 57, 58, and 59. The coupling sleeves 51, 52, 53 are provided so as to be movable in the axial direction by a spline connection via a hub, which is not shown, fixed to the fourth shaft 14, the first shaft 11, and the third shaft 13, and have dog teeth 51a, 51b; 52a, 52b; and 53a, 53b on both sides having flat top faces. Furthermore, fork grooves 51c, 52c, and 53c are provided in the circumferential center portions of the coupling sleeves 51, 52, and 53. The left dog clutch rings 54, 55, and 56 are fixed to the boss portions of the gears 113, 103, and 110, which are left idling gears of the engagement clutches C1, C2 and C3, and have dog teeth 54a, 55a, and 56a with flat top faces that oppose the dog teeth 51a, 52a, and 53a. The right dog clutch rings 57, 58, and 59 are fixed to the boss portions of the gears 112, 102, and 109, which are right idling gears of the engagement clutches C1, C2 and C3, and have dog teeth 57b, 58b, and 59b with flat top faces that oppose the dog teeth 51b, 52b, and 53b.

The first engagement clutch operating mechanism 41, the second engagement clutch operating mechanism 42, and the third engagement clutch operating mechanism 43 convert the turning motions of the electric actuators 31, 32, and 33 into axial movement of the coupling sleeves 51, 52, and 53. The engagement clutch operating mechanisms 41, 42, and 43 all have the same configuration, comprising turning links 61, 62, and 63; shift rods 64, 65, and 66; and shift forks 67, 68, and 69. One end of each of the turning links 61, 62, and 63 is connected to one of the actuator shafts of the electric actuators 31, 32, and 33, and the other ends are connected to the shift rods 64, 65, and 66 so as to be relatively displaceable. The shift rods 64, 65, and 66 are capable of expanding and contracting according to the magnitude and the direction of the rod transmitting force, by having springs 64a, 65a, and 66a interposed in the rod dividing positions. One end of each of the shift forks 67, 68, and 69 are fixed to one of the shift rods 64, 65, and 66, and the other end is disposed in one of the fork grooves 51c, 52c, or 53c of the coupling sleeves 51, 52, and 53.

The transmission control unit 23 inputs sensor signals and switch signals from a vehicle speed sensor 71, an accelerator position opening amount sensor 72, a transmission output shaft rotational speed sensor 73, an engine rotation speed sensor 74, an MG1 rotation speed sensor 75, an MG2 rotation speed sensor 76, an inhibitor switch 77, and the like. The transmission output shaft rotational speed sensor 73 is provided on the shaft end portion of the third shaft 13 and detects the shaft rotation speed of the third shaft 13. Then, a position servo control unit (for example a position servo system by PID control) is provided, which controls mesh engagement and disengagement of the engagement clutches C1, C2 and C3, determined by the positions of the coupling sleeves 51, 52, and 53. The position servo control unit inputs sensor signals from a first sleeve position sensor 81, a second sleeve position sensor 82, and a third sleeve position sensor 83. Then, the sensor values of the sleeve position sensors 81, 82, and 83 are read, and a current is imparted to the electric actuators 31, 32, and 33 such that the positions of the coupling sleeves 51, 52, and 53 will be in the disengaged position or the engagement position according to an engagement stroke. That is, by setting an engaged state in which the dog teeth of the coupling sleeves 51, 52, and 53, and the dog teeth of the idling gears are both in engagement positions with each other, the idling gears are drivingly connected to the fourth shaft 14, the first shaft 11, and the third shaft 13. On the other hand, by setting a disengaged state in which the dog teeth of the coupling sleeves 51, 52, and 53 and the dog teeth of the idling gears are in non-engagement positions by displacing the coupling sleeves 51, 52, and 53 in the axial direction, the idling gears are disconnected from the fourth shaft 14, the first shaft 11, and the third shaft 13.

Configuration of the Gear Shift Pattern

The multistage gear transmission 1 of the first embodiment is characterized in that size reduction is achieved by reducing the power transmission loss by not having a differential rotation absorbing element, such as a fluid coupling, and by reducing the gear shift stages of the ICE by providing motor assistance to the internal combustion engine ICE (EV gear shift stages: 1-2 speed, ICE gear shift stages: 1-4 speed). The configuration of the gear shift pattern of the multistage gear transmission is described below based on FIG. 3 and FIG. 4.

Figure 3:
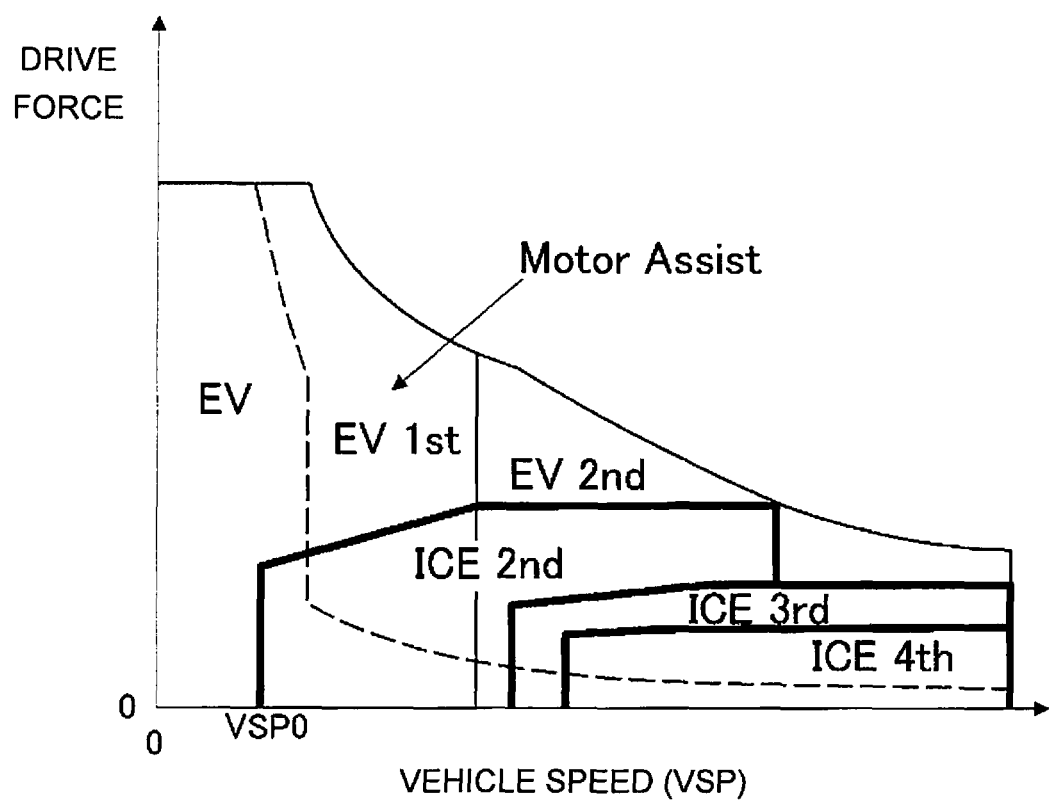
FIG. 3 is a schematic overview of a shifting map illustrating a concept of switching the gear shift pattern in a multistage gear transmission mounted on a hybrid vehicle to which is applied the starting control device of the first embodiment.

A concept of a gear shift pattern is employed in which, when the vehicle speed VSP is in a starting region that is equal to, or less than, a predetermined vehicle speed VSP0, since the multistage gear transmission 1 does not have a differential rotation absorbing element, a motor start by only the motor driving force is carried out in the "EV mode," as illustrated in FIG. 3. Then, when in the traveling region and the demand for driving force is great, a "parallel HEV mode" is employed in which the engine driving force is assisted by the motor driving force, as illustrated in FIG. 3. That is, as the vehicle speed VSP increases, the ICE gear shift stages shift from (ICE $1^{st}$)→ICE 2nd→ICE 3rd→ICE 4th, and the EV gear shift stages shift from EV1st→EV 2nd. Therefore, based on the concept of the gear shift pattern illustrated in FIG. 3, a shifting map for issuing gear shift requests for switching the gear shift pattern is created.

The gear shift patterns obtainable by the multistage gear transmission 1 having engagement clutches C1, C2 and C3 are as shown in FIG. 4. In FIG. 4, "Lock" represents an interlock pattern that is not applicable as a gear shift pattern; "EV-" represents a state in which the first motor/generator MG1 is not drivingly connected to the driving wheels 19; and "ICE-" represents a state in which the internal combustion engine ICE is not drivingly connected to the driving wheels 19. In the shift control, it is not necessary to use all the gear shift patterns shown in FIG. 4, and it is, of course, possible to select from these gear shift patterns according to need. Each of the gear shift patterns is described below.

When the second engagement clutch C2 is "N" and the third engagement clutch C3 is "N," the following gear shift patterns are obtained according to the position of the first engagement clutch C1. "EV-ICEgen" is obtained if the first engagement clutch C1 is "Left", "Neutral" is obtained if the first engagement clutch C1 is "N", and "EV-ICE 3rd" is obtained if the first engagement clutch C1 is "Right". Here, the gear shift pattern "EV-ICEgen" is a pattern selected at the time of MG1 idle power generation, in which power is generated in the first motor/generator MG1 by the internal combustion engine ICE when the vehicle is stopped, or at the time of double idle power generation in which MG2 power generation is carried out in addition to MG1 power generation. The gear shift pattern "Neutral" is a pattern selected at the time of MG2 idle power generation, in which power is generated in the second motor/generator MG2 by the internal combustion engine ICE when the vehicle is stopped.

When the second engagement clutch C2 is "N" and the third engagement clutch C3 is "Left," the following gear shift patterns are obtained according to the position of the first engagement clutch C1. "EV1st ICE 1st" is obtained if the first engagement clutch C1 is "Left", "EV1st ICE-" is obtained if the first engagement clutch C1 is "N", and "EV1st ICE 3rd" is obtained if the first engagement clutch C1 is "Right". Here, the gear shift pattern "EV1st ICE-" is an "EV mode" pattern in which the internal combustion engine ICE is stopped and traveling is carried out by the first motor/generator MG1, or a "series HEV mode" pattern in which a first-speed EV traveling is carried out by the first motor/generator MG1 while power is generated in the second motor/generator MG2 by the internal combustion engine ICE. Therefore, for example when traveling while selecting the "series HEV mode" by "EV1st ICE-", the first engagement clutch C1 is switched from "N" to "Left", based on a deceleration due to insufficient driving force. In this case, the vehicle is transitioned to traveling by a "parallel HEV mode (first speed)" according to the "EV1st ICE 1st" gear shift pattern, in which the driving force is secured.

When the second engagement clutch C2 is "Left" and the third engagement clutch C3 is "Left", "EV1st ICE 2nd" is obtained if the position of the first engagement clutch C1 is "N". Therefore, for example if the driving force requirement is increased during first-speed EV traveling while selecting the "series HEV mode" by "EV1st ICE-", the second engagement clutch C2 is switched from "N" to "Left". In this case, the vehicle is transitioned to traveling by a "parallel HEV mode" according to the "EV1st ICE 2nd" gear shift pattern, in which the driving force is secured.

When the second engagement clutch C2 is "Left" and the third engagement clutch C3 is "N", the following gear shift patterns are obtained according to the position of the first engagement clutch C1. "EV 1.5 ICE 2nd" is obtained if the first engagement clutch C1 is "Left", and "EV-ICE 2nd" is obtained if the first engagement clutch C1 is "N".

When the second engagement clutch C2 is "Left" and the third engagement clutch C3 is "Right", "EV 2nd ICE 2nd" is obtained if the position of the first engagement clutch C1 is "N". Therefore, for example, when traveling in the "parallel HEV mode" while selecting the "EV1st ICE 2nd" gear shift pattern, the third engagement clutch C3 is switched from "Left" to "Right" via "N" according to an up-shift request. In this case, the vehicle is transitioned to traveling by the "parallel HEV mode" according to the "EV 2nd ICE 2nd" gear shift pattern, in which the EV gear shift stage is set to second speed. For example when traveling in the "parallel HEV mode" while selecting the "EV 2nd ICE 4th" gear shift pattern, the second engagement clutch C2 is switched from "Right" to "Left" via "N" according to a downshift request. In this case, the vehicle is transitioned to traveling by the "parallel HEV mode" according to the "EV 2nd ICE 2nd" gear shift pattern, in which the ICE gear shift stage is set to second speed.

When the second engagement clutch C2 is "N" and the third engagement clutch C3 is "Right", the following gear shift patterns are obtained according to the position of the first engagement clutch C1. "EV 2nd ICE 3rd" is obtained if the first engagement clutch C1 is "Left", "EV 2nd ICE-" is obtained if the first engagement clutch C1 is "N" and "EV 2nd ICE 3rd" is obtained if the first engagement clutch C1 is "Right". Here, the gear shift pattern "EV 2nd ICE-" is an "EV mode" pattern in which the internal combustion engine ICE is stopped and traveling is carried out by the first motor/generator MG1, or, a "series HEV mode" pattern in which a second-speed EV traveling is carried out by the first motor/generator MG1 while power is generated in the second motor/generator MG2 by the internal combustion engine ICE. Therefore, for example when traveling in the "parallel HEV mode" while selecting the "EV 2nd ICE 2nd" gear shift pattern, the second engagement clutch C2 is switched from "Right" to "N" and the first engagement clutch C1 is switched from "N" to "Right", according to an up-shift request. In this case, the vehicle is transitioned to traveling by the "parallel HEV mode" according to the "EV 2nd ICE 3rd" gear shift pattern, in which the ICE gear shift stage is set to third speed.

When the second engagement clutch C2 is "Right" and the third engagement clutch C3 is "Right", "EV 2nd ICE 4th" is obtained if the position of the first engagement clutch C1 is "N".

When the second engagement clutch C2 is "Right" and the third engagement clutch C3 is "N", the following gear shift patterns are obtained according to the position of the first engagement clutch C1. "EV 2.5 ICE 4th" is obtained if the first engagement clutch C1 is "Left", and "EV-ICE 4th" is obtained if the first engagement clutch C1 is "N".

When the second engagement clutch C2 is "Right" and the third engagement clutch C3 is "Left", "EV1st ICE 4th" is obtained if the position of the first engagement clutch C1 is "N".

Configuration of the Starting Control Process

Figure 5:
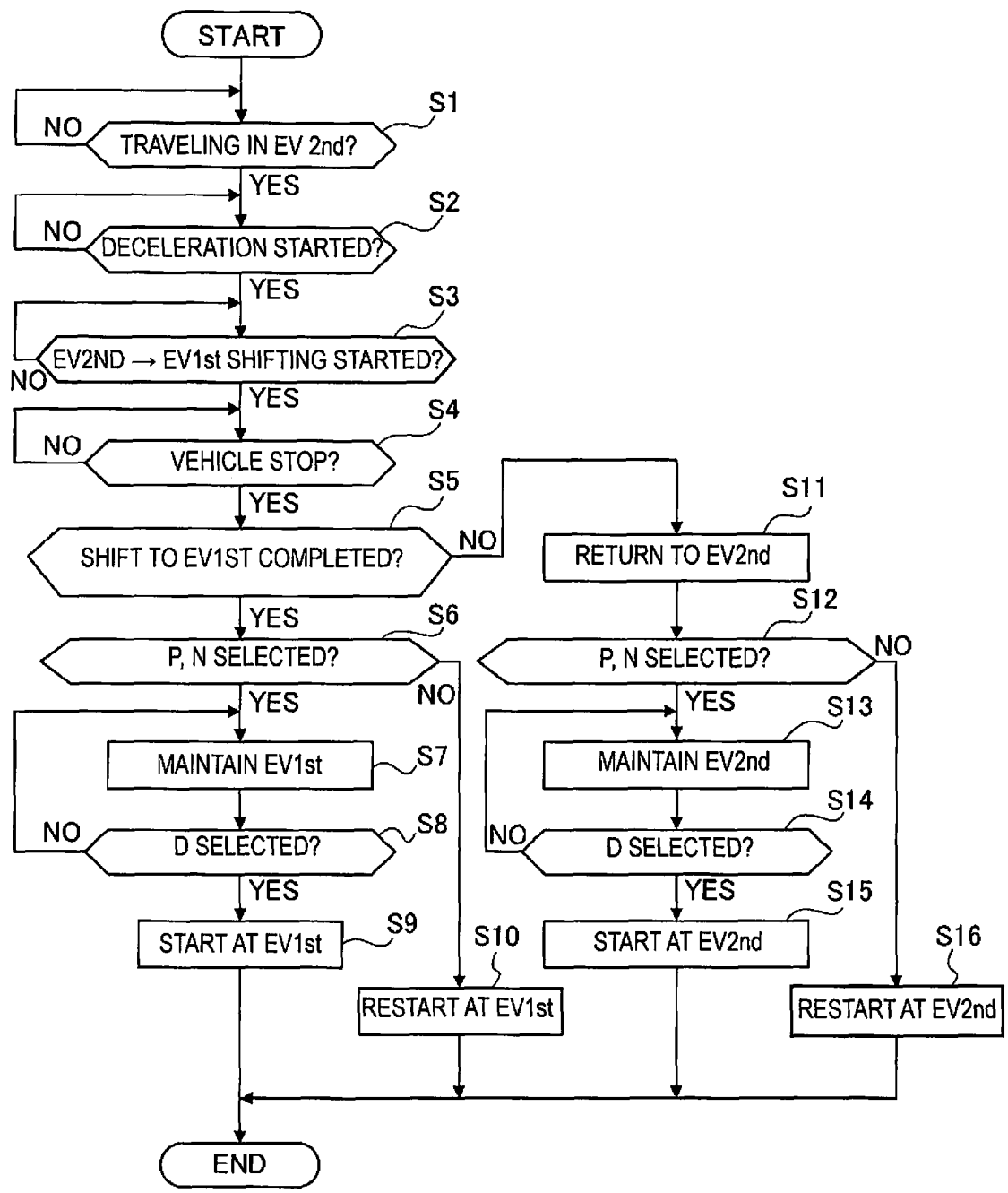
FIG. 5 is a flowchart illustrating the flow of a starting control process carried out in a transmission control unit of the first embodiment.

FIG. 5 illustrates flow of a starting control process carried out in the transmission control unit 23 (starting controller) of the first embodiment. Each of the steps in FIG. 5, which shows one example of the configuration of the starting control process, will be described below. In this process, the "EV2nd ICE-" gear shift pattern, in which the first engagement clutch C1 and the second engagement clutch C2 are both "N" and the third engagement clutch C3 is "Right", is referred to as "EV2nd." In addition, the "EV1st ICE-" gear shift pattern, in which the first engagement clutch C1 and the second engagement clutch C2 are both "N" and the third engagement clutch C3 is "Left" is referred to as "EV1st".

In Step S1, it is determined whether or not traveling is being carried out by selecting the "EV2nd" gear shift pattern. In the case of YES (traveling by EV2nd), the process proceeds to Step S2, and if NO (traveling by other than EV2nd), the determination of Step S1 is repeated. Here, a gear shift pattern according to "EV2nd" is determined when the sensor signals from the first sleeve position sensor 81 and the second sleeve position sensor 82 indicate the "N" position, and the sensor signal from the third sleeve position sensor 83 indicates the "Right" position.

In Step S2, following a determination that traveling is being carried out by selecting the "EV2nd" gear shift pattern in Step S1, it is determined whether or not deceleration has started. In the case of YES (deceleration started), the process proceeds to Step S3, and if NO (deceleration has not started), the determination of Step S2 is repeated. Here, a deceleration start is determined from a decrease in the vehicle speed, a foot release operation, a brake depression operation, or the like.

In Step S3, following a determination that deceleration has started in Step S2, it is determined whether or not it is an EV2nd→EV1st downshift start, in which the gear shift pattern is switched from "EV2nd" to "EV1st." In the case of YES (EV2nd→EV1st downshift start), the process proceeds to Step S4, and if NO (not EV2nd→EV1st downshift start), the determination of Step S3 is repeated. Here, an EV2nd→EV1st downshift start is determined from the presence/absence of a shift request to switch the gear shift pattern from "EV2nd" to "EV1st".

In Step S4, following a determination that it is EV2nd→EV1st downshift start in Step S3, it is determined whether or not the vehicle is in s stopped state. In the case of YES (vehicle stop), the process proceeds to Step S5, and if NO (traveling), the determination of Step S4 is repeated. Here, a vehicle stopped state is determined when a vehicle speed signal from the vehicle speed sensor 71 indicates a vehicle stopped state.

In Step S5, following the determination of a vehicle stopped state in Step S4, it is determined whether or not downshift to "EV1st" has been completed. In the case of YES (downshift to EV1st completed), the process proceeds to Step S6, and if NO (downshift to EV1st not completed), the process proceeds to Step S11. Here, a completion of downshift to "EV1st" is determined when the sensor signals from the first sleeve position sensor 81 and the second sleeve position sensor 82 indicate the "N" position, and the sensor signal from the third sleeve position sensor 83 indicates the "Left" position. If the sensor signal from the third sleeve position sensor 83 has not reached the "Left" position, shifting to "EV1st" is determined to be incomplete.

In Step S6, following a determination downshift to "EV1st" has been completed in Step S5, it is determined whether or not there has been a selection operation by a lever operation of the driver from the "D range" to the "P range" or the "N range". In the case of YES (selection operation to P, N present), the process proceeds to Step S7, and if NO (selection operation to P, N absent), the process proceeds to Step S10. Here, a selection operation from the "D range" to the "P range" or the "N range" is determined from a switch signal from the inhibitor switch 77.

In Step S7, following the determination that a selection operation to P, N is present in Step S6, or the determination that a selection operation to the D range is absent in Step S8, "EV1st" is maintained as the gear shift pattern of the multistage gear transmission 1, and the process proceeds to Step S8. Here, maintaining "EV1st" means to maintain a state in which both the first engagement clutch C1 and the second engagement clutch C2 are put in the "N" position, and the third engagement clutch C3 is put in the "Left" position.

In Step S8, following the maintenance of "EV1st" in Step S7, it is determined whether or not there has been a selection operation by a lever operation of the driver from the "P range" or the "N range" to the "D range." In the case of YES (selection operation to D present), the process proceeds to Step S9, and if NO (selection operation to D absent), the process returns to Step S7. Here, a selection operation from the "P range" or the "N range" to the "D range" is determined from a switch signal from the inhibitor switch 77.

In Step S9, following the determination that a selection operation to the "D range" is present in Step S8, the vehicle is started in "EV1st" maintained in Step S7, and the process proceeds to End.

In Step S10, following the determination that a selection operation to P, N is absent (=D range) in Step S6, the vehicle is started in "EV1st" to which downshift is completed, and the process proceeds to End.

In Step S11, following the determination that a downshift to "EV1st" has not been completed in Step S5, the gear shift pattern is returned to "EV2nd" before downshift is started, and the process proceeds to Step S12. That is, if the sensor signal from the third sleeve position sensor 83 has not reached the "Left" position, the coupling sleeve 53 is returned from the position at the time of the determination of a vehicle stop to the "Right" position, in the reverse direction.

In Step S12, following the return operation to "EV2nd" in Step S11, it is determined whether or not there has been a selection operation by a lever operation of the driver from the "D range" to the "P range" or the "N range." In the case of YES (selection operation to P, N present), the process proceeds to Step S13, and if NO (selection operation to P, N absent), the process proceeds to Step S16. Here, a selection operation from the "D range" to the "P range" or the "N range" is determined from a switch signal from the inhibitor switch 77.

In Step S13, following the determination that a selection operation to P, N is present in Step S12, or, the determination that a selection operation to the D range is absent in Step S14, "EV2nd" is maintained as the gear shift pattern of the multistage gear transmission 1, and the process proceeds to Step S14. Here, maintaining "EV2nd" means to maintain a state in which both the first engagement clutch C1 and the second engagement clutch C2 are in the "N" position, and the third engagement clutch C3 is in the "Right" position.

In Step S14, following the maintenance of "EV2nd" in Step S13, it is determined whether or not there has been a selection operation by a lever operation of the driver from the "P range" or the "N range" to the "D range." In the case of YES (selection operation to D present), the process proceeds to Step S15, and if NO (selection operation to D absent), the process returns to Step S13. Here, a selection operation from the "P range" or the "N range" to the "D range" is determined from a switch signal from the inhibitor switch 77.

In Step S15, following the determination that a selection operation to the "D range" is present in Step S14, the vehicle is started in "EV2nd" maintained in Step S13, and the process proceeds to End.

In Step S16, following the determination that a selection operation to P, N is absent (=D range) in Step S12, the vehicle is restarted in "EV2nd" to which it is returned in Step S11, and the process proceeds to End.

Next, the actions are described. The "action of the starting control process", "action of the starting control", and the "characteristic action of the starting control" will be separately described, regarding the actions of the device for controlling starting of a hybrid vehicle according to the first embodiment.

Action of the Starting Control Process

The action of the starting control process, in which deceleration and shifting is started in an EV traveling state according to the "EV2nd" gear shift pattern to stop the vehicle, and the vehicle carries out an EV start from the vehicle stopped state, will be described below, based on the flowchart of FIG. 5.

When deceleration is started in an EV traveling state according to a selection of the "EV2nd" gear shift pattern, and a downshift to switch the gear shift pattern from "EV2nd" to "EV1st" during deceleration is started, the process proceeds from Step S1→Step S2→Step S3→Step S4, in the flowchart of FIG. 5. When this downshift from "EV2nd" to "EV1st" is started, downshift from "EV2nd" to "EV1st" is advanced during the deceleration period in which it is determined in Step S4 that vehicle stop has not been reached.

Then, when it is determined in Step S4 that a vehicle stopped state has been reached, it is determined whether or not shifting to "EV1st" has been completed in the subsequent Step S5. When it is determined in Step S5 that downshift to "EV1st" has been completed, the process proceeds to Step S6-Step S10, in which "EV1st" after the downshift is maintained. On the other hand, when it is determined in Step S5 that downshift to "EV1st" has not been completed, the process proceeds to Step S11-Step S16, in which "EV2nd" before the downshift is maintained.

In the flow proceeding from Step S6 to Step S10, for example, when there is a selection operation from the "D range" to the "P range" or the "N range" with the intention of stopping the vehicle for a long time or parking for a long time, the process proceeds from Step S6 to Step S7→Step S8. Then, until a selection operation to the "D range" is determined in Step S8, the flow proceeding from Step S7→Step S8 is repeated, and in Step S7, "EV1st" is maintained as the gear shift pattern of the multistage gear transmission 1.

Then, when a selection operation to the "D range," which is a starting request, is determined in Step S8, the process proceeds from Step S8 to Step S9→End, and in Step S9, "EV1st" maintained in Step S7 is set as the starting gear shift pattern to start the vehicle according to a brake foot release operation and an accelerator depression operation. On the other hand, if a selection operation is not carried out keeping the "D range," for example when waiting for a traffic light, during which the vehicle is stopped for a short time, the process proceeds from Step S6 to Step S10→End. In this Step S10, "EV1st" to which the downshift has been completed is set as the starting gear shift pattern, to restart the vehicle according to a brake foot release operation and an accelerator depression operation.

In the flow proceeding from Step S11 to Step S16, first, when it is determined in Step S5 that shifting to "EV1st" has not been completed, the process proceeds from Step S5 to Step S11, and in Step S11, the gear shift pattern is returned to "EV2nd" before the downshift is started. Then, for example, when there is a selection operation from the "D range" to the "P range" or the "N range" with the intention of stopping the vehicle for a long time or parking for a long time, the process proceeds from Step S12 to Step S13→Step S14. Then, until a selection operation to the "D range" is determined in Step S14, the flow proceeding from Step S13→Step S14 is repeated, and in Step S13, "EV2nd" is maintained as the gear shift pattern of the multistage gear transmission 1.

Then, when a selection operation to the "D range," which is a starting request, is determined in Step S14, the process proceeds from Step S14 to Step S15→End, and in Step S15, "EV2nd" maintained in Step S13 is set as the starting gear shift pattern to start the vehicle according to a brake foot release operation and an accelerator depression operation. On the other hand, if a selection operation is not carried out keeping the "D range," for example when waiting for a traffic light, during which the vehicle is stopped for a short time, the process proceeds from Step S12 to Step S16→End. In this Step S16, "EV2nd" to which it is returned in Step S11 is set as the starting gear shift pattern, to restart the vehicle according to a brake foot release operation and an accelerator depression operation.

Action of the Starting Control

The action of the starting control accompanied by a downshift to switch the gear shift pattern from "EV2nd" to "EV1st" will be described below, based on FIG. 6-FIG. 9.

Figure 6:
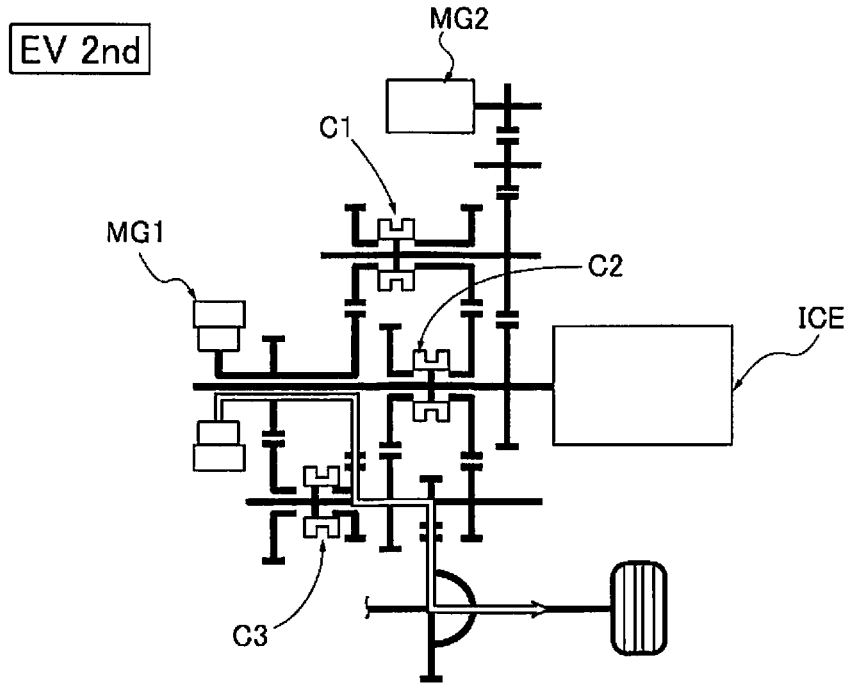
FIG. 6 is a torque flow diagram illustrating the flow of the MG1 torque in a multistage gear transmission when the "EV2nd" gear shift pattern is selected.

First, the flow of the MG1 torque in the multistage gear transmission 1 when the "EV2nd" gear shift pattern is selected will be described based on FIG. 6. In the "EV2nd" gear shift pattern, the first engagement clutch C1 is in the "N" position, the second engagement clutch C2 is in the "N" position, and the third engagement clutch C3 is in the "Right" position. Therefore, the MG1 torque flows from the first motor/generator MG1 to the second shaft 12→the fourth gear 104→the ninth gear 109→the third shaft 13→the seventh gear 107→the sixteenth gear 116→the differential gear 17→the drive shaft 18→the driving wheels 19.

Figure 7:
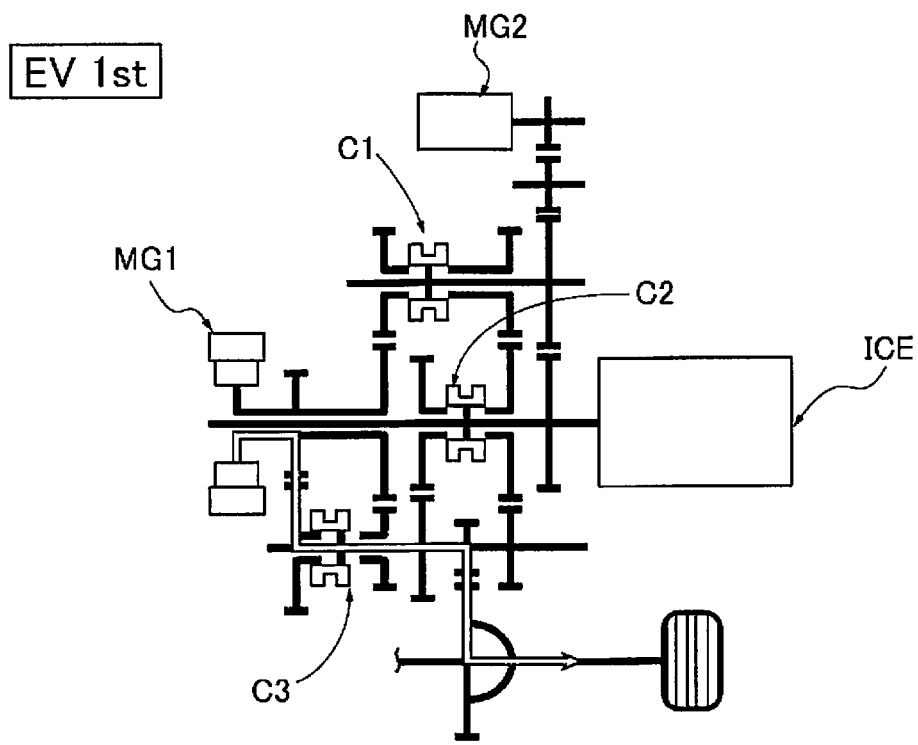
FIG. 7 is a torque flow diagram illustrating the flow of the MG1 torque in a multistage gear transmission when the "EV1st" gear shift pattern is selected.

Next, the flow of the MG1 torque in the multistage gear transmission 1 when the "EV1st" gear shift pattern is selected will be described based on FIG. 7. In the "EV1st" gear shift pattern, the first engagement clutch C1 is in the "N" position, the second engagement clutch C2 is in the "N" position, and the third engagement clutch C3 is in the "Left" position. Therefore, the MG1 torque flows from the first motor/generator MG1 to the second shaft 12→the fifth gear 105→the tenth gear 110→the third shaft 13→the seventh gear 107→the sixteenth gear 116→the differential gear 17→the drive shaft 18→the driving wheels 19.

Therefore, a downshift in which the gear shift pattern is switched from "EV2nd" to "EV1st" is achieved by moving the coupling sleeve 53 of the third engagement clutch C3 from the "Right" engagement position to the "Left" engagement position via the "N" position. At this time, the first engagement clutch C1 and the second engagement clutch C2 are kept in the "N" positions.

The action of the starting control accompanied by a downshift by switching the gear shift pattern from "EV2nd" to "EV1st" will be described below, based on FIG. 8 and FIG. 9. Here, the third engagement clutch C3 having clutch portions at the two engagement positions of "Right" and "Left" corresponds to the start clutch engaged when there is a starting request. Then, of the third engagement clutch C3, the clutch portion configured by the coupling sleeve 53 and the right dog clutch ring 59, and in which the engagement position of the dog teeth 53b and 59b is "Right," is called the "MG1 2nd clutch" (corresponding to the second start clutch). Of the third engagement clutch C3, the clutch portion configured by the coupling sleeve 53 and the left dog clutch ring 56, and in which the engagement position of the dog teeth 53a and 56a is "Left," is called the "MG1 1st clutch" (corresponding to the first start clutch).

Figure 8:
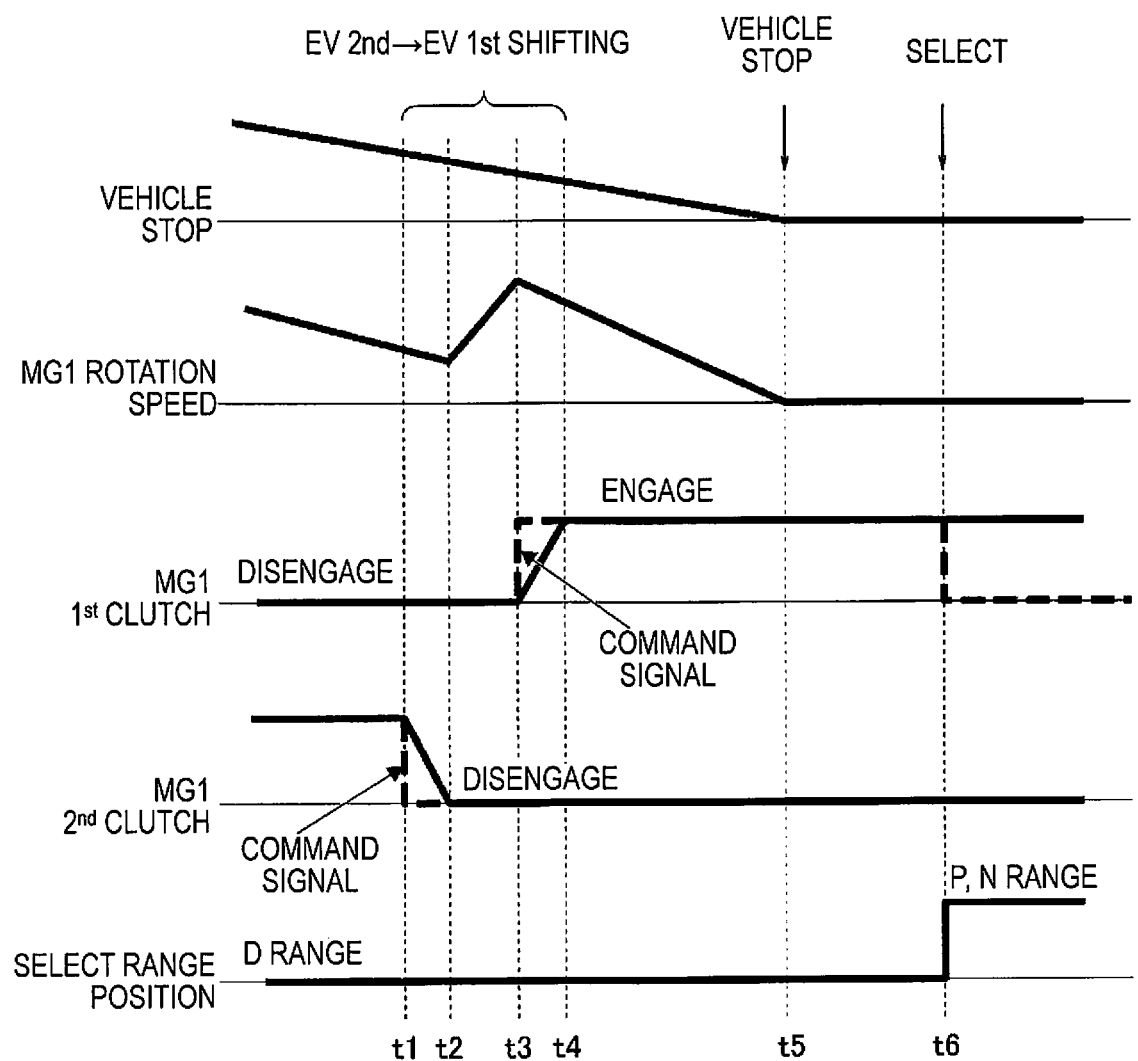
FIG. 8 is a time chart illustrating each of the characteristics of the vehicle speed/MG1 rotation speed/MG1 1st clutch/MG1 2nd clutch/select range position, when the vehicle is stopped by completing a downshift, in which the gear shift pattern of the multistage gear transmission is switched from "EV2nd" to "EV1st," during deceleration.

FIG. 8 is a time chart when the vehicle is stopped by completing a downshift in which the gear shift pattern of the multistage gear transmission 1 is switched from "EV2nd" to "EV1st" during deceleration. In FIG. 8, time t1 is the release command time of the MG1 2nd clutch. Time t2 is the release completion time of the MG1 2nd clutch. Time t3 is the engagement command time of the MG1 1st clutch. Time t4 is the engagement completion time of the MG1 1st clutch. Time t5 is the vehicle stop time. Time t6 is the selection operation time from the D range to the P range or the N range.

When there is a downshift request to switch the gear shift pattern from "EV2nd" to "EV1st" during deceleration, a release command is output to the MG1 2nd clutch at time t1, and the release of the MG1 2nd clutch is completed at time t2. Between time t2 to time t3, the coupling sleeve 53 of the third engagement clutch C3 is in a position that is not engaged to the MG1 1st clutch side or to the MG1 2nd clutch side, and the multistage gear transmission 1 is in the neutral state. Therefore, the rotational speed of the first motor/generator MG1 increases as the motor load decreases between time t2 to time t3.

Then, an engagement command is output to the MG1 1st clutch at time t3, and the engagement of the MG1 1st clutch is completed at time t4, which is during deceleration. Between this time t4 to time t5, the rotational speed of the first motor/generator MG1 decreases as the vehicle speed decreases, and at the vehicle stop time t5, the rotational speed of the first motor/generator MG1 becomes zero.

Since shifting to "EV1st" is completed at this vehicle stop time t5, between time t5 and time t6, when the vehicle is in the D range, "EV1st" by the engagement of the MG1 1st clutch is maintained as the starting gear shift stage. Then, when there is a selection operation from the D range to the P range or the N range at time t6, in the case of a normal shift control method, the MG1 1st clutch is released (dashed line of FIG. 8) and the multistage gear transmission 1 is put in a neutral state. However, despite a selection operation from the D range to the P range or the N range, after time t6 and until the next starting request operation is carried out, "EV1st" by the engagement of the MG1 1st clutch is maintained as the starting gear shift stage.

Figure 9:
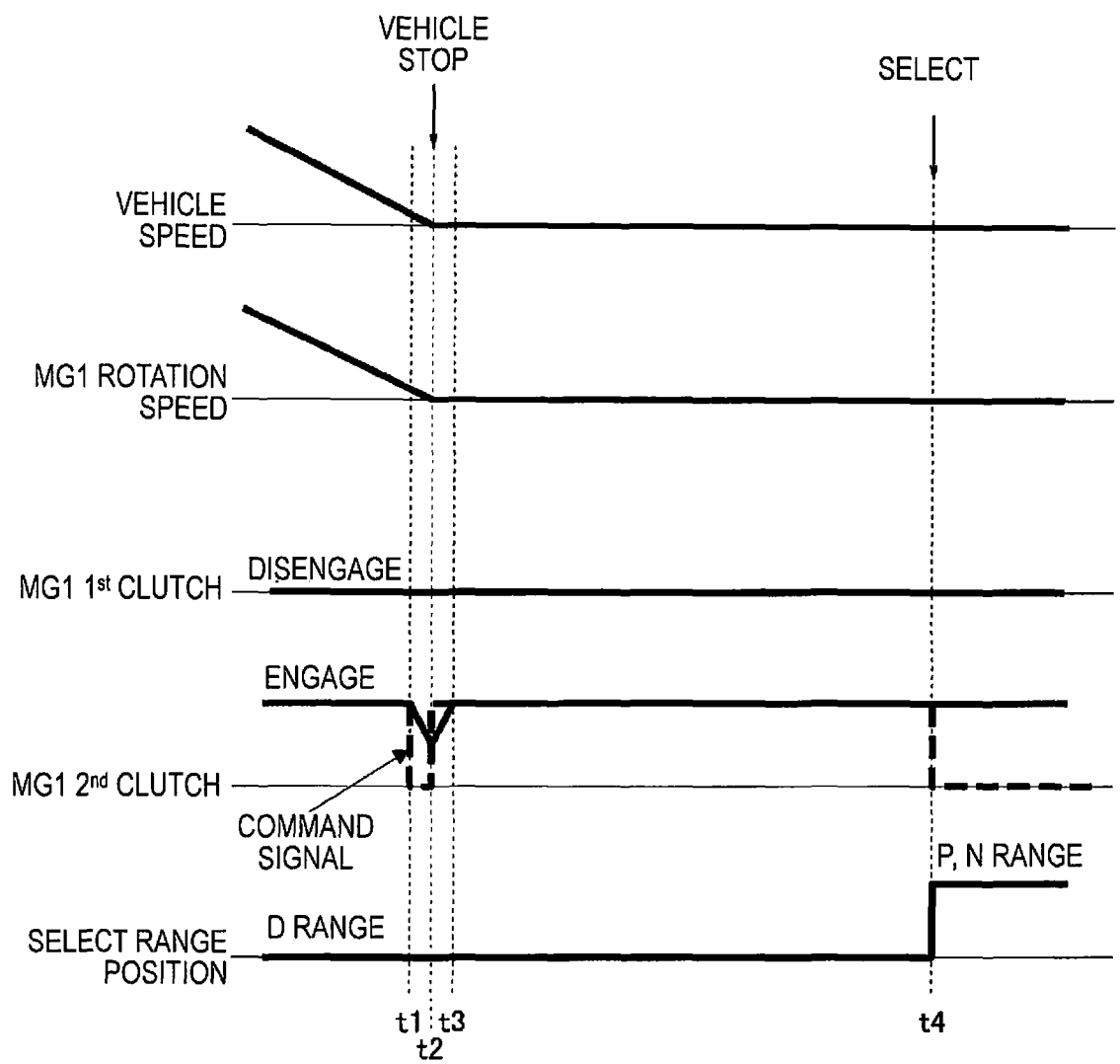
FIG. 9 is a time chart illustrating each of the characteristics of the vehicle speed/MG1 rotation speed/MG1 1st clutch/MG1 2nd clutch/select range position, when the vehicle is stopped without completing a downshift, in which the gear shift pattern of the multistage gear transmission is switched from "EV2nd" to "EV1st," during deceleration.

FIG. 9 is a time chart when the vehicle is stopped without completing a downshift in which the gear shift pattern of the multistage gear transmission 1 is switched from "EV2nd" to "EV1st" during deceleration. In FIG. 9, time t1 is the release command time of the MG1 2nd clutch. Time t2 is the vehicle stop time, as well as the return engagement command time of the MG1 2nd clutch. Time t2 is the return engagement completion time of the MG1 2nd clutch. Time t4 is the selection operation time from the D range to the P range or the N range.

When there is a downshift request to switch the gear shift pattern from "EV2nd" to "EV1st" during deceleration immediately before the vehicle stops, a release command is output to the MG1 2nd clutch at time t1, but the vehicle stops at time t2 without waiting for the completion of the release of the MG1 2nd clutch. Therefore, a return engagement command of the MG1 2nd clutch is output at the vehicle stop time t2, and the return engagement of the MG1 2nd clutch is completed at time t3. That is, it is returned to the gear shift stage of "EV2nd" before the downshift, in which the coupling sleeve 53 of the third engagement clutch C3 engages the MG1 2nd clutch side.

Then, since the shift return to "EV2nd" is completed at time t3, between time t3 and time t4, when the vehicle is in the D range, "EV2nd" by the engagement of the MG1 2nd clutch is maintained as the starting gear shift stage. Then, when there is a selection operation from the D range to the P range or the N range at time t4, in the case of a normal shift control method, the MG1 2nd clutch is released (dashed line of FIG. 9) and the multistage gear transmission 1 is put in a neutral state. However, despite a selection operation from the D range to the P range or the N range, after time t4 and until the next starting request operation is carried out, "EV2nd" by the engagement of the MG1 2nd clutch is maintained as the starting gear shift stage.

Characteristic Action of the Starting Control

The first embodiment is configured such that, if the third engagement clutch C3 is engaged when the vehicle is stopped, the engagement of the third engagement clutch C3 is maintained for a duration that includes the vehicle stopped state and until the next starting.

That is, when the start clutch is the engagement clutch, if the phases of the top faces of the dog teeth are matched with each other, movement in the engaging direction is not possible; if a forcible engagement is attempted, starting shock occurs due to fluctuation of the transmission torque when the dog teeth come into contact, or during the initial stages of meshing. In order to suppress the starting shock, it is necessary to cause an engagement after shifting the phases, which requires time. Consequently, when trying to start by carrying out an engagement operation of the engagement clutch when the vehicle is stopped, it is necessary to wait until the meshing engagement is completed, so the vehicle cannot start promptly. In contrast, by the third engagement clutch C3 being engaged in advance, when there is a starting request from a stopped vehicle, an engagement operation of the third engagement clutch C3, which is meshed and engaged, becomes unnecessary. Therefore, starting shock is suppressed, and the time required from a starting request to the starting of the vehicle is reduced. Therefore, even if there is a request for a quick start, a corresponding quick starting response can be secured.

For example, when passing the N range from the P range in an uphill sloped road, or when selecting the N range from the P range, the vehicle falls backward in the N range, which cuts off the power transmission path. In the same manner, the vehicle slides forward in the N range on a downhill sloped road. In contrast, the engagement of the third engagement clutch C3, which is engaged when the vehicle stops, is maintained for a duration that includes the vehicle being stopped and until the next starting. Accordingly, even when carrying out an operation that passes the N range, or an operation for selecting the N range in a vehicle stopped on a sloped road, the power transmission path is not cut off, and the sliding down of the vehicle is prevented.

The first embodiment is configured such that when there is a selection operation from the D range to the P range or the N range in a stopped vehicle, a starting gear shift stage according to "EV1st" or "EV2nd" is maintained until the next time the D range is selected (S7 S13). Therefore, even when there is a request for a quick start from the P range or the N range, the time required from a selection operation to the D range to the starting of the vehicle is reduced.

The first embodiment is configured in the following manner: first, it is assumed that a downshift control from "EV2nd" to "EV1st" is started during deceleration before a vehicle stops, and the downshift to "EV1st" is completed at the time of the vehicle stop. In this case, if there is a selection operation from the D range to the P, N range in the stopped vehicle, the "EV1st" after the downshift is maintained until the next time the D range is selected (S5→S6→S7→S8). Therefore, when the downshift to "EV1st" is completed at the time of the vehicle stop, an EV start by "EV1st," with a high start drive performance can be secured with respect to the next starting request.

In the first embodiment, next it is assumed that a downshift control from "EV2nd" to "EV1st" is started during deceleration before a vehicle stop, and the downshift to "EV1st" is not completed at the time the vehicle stops. In this case, it is returned to "EV2nd" before the downshift, and if there is a selection operation from the D range to the P range or the N range when the vehicle is stopped, the "EV2nd" to which it is returned, is maintained until the next time the D range is selected (S5→S1→S12→S13→S14). Therefore, when the downshift to "EV1st" is not completed at the time the vehicle stops, an EV start by "EV2nd" can be secured with respect to the next starting request.

In the first embodiment, if a selection operation to another range (P, N range) is not carried out maintaining the D range when the vehicle is stopped, the vehicle is started by a starting gear shift stage according to "EV1st" or "EV2nd" (S6→S10, S12→S16). Therefore, the time required from a starting request operation to a restart is reduced, with respect to a request for a quick restart in which a selection operation for changing the range position is not carried out.

In the first embodiment, the transmission is a multistage gear transmission 1 of a hybrid vehicle. This multistage gear transmission 1 is configured to comprise a third engagement clutch C3 that selects "EV1st" when the movement direction of the coupling sleeve 53 from the N position is in one direction, and selects "EV2nd" when in another direction, carries out an EV start by not having a differential rotation absorbing element (FIG. 3). Therefore, upon an EV start in a hybrid vehicle, an EV start selecting the "EV1st" or "EV2nd" gear shift pattern having a common coupling sleeve 53 is secured.

Next, the effects are described. The effects listed below can be obtained by the device for controlling starting of a hybrid vehicle according to the first embodiment.

(1) In an electrically driven vehicle (hybrid vehicle) in which a drive system is provided with an electric motor (first motor/generator MG1) as a power source, a transmission (multistage gear transmission 1) that converts an output from the electric motor (first motor/generator MG1) and transmits the output to drive wheels 19, in which the transmission (multistage gear transmission 1) has engagement clutches C1, C2 and C3 as shifting elements that meshingly engage by a stroke from a disengaged position, wherein assuming that, among the engagement clutches C1, C2 and C3, the clutch that is meshingly engaged when there is a starting request is called a start clutch (third engagement clutch C3), a starting controller (transmission control unit 23, FIG. 5) is provided, which maintains the engagement of the start clutch (third engagement clutch C3) for a duration that includes the vehicle stopped state and until the next starting, if the start clutch (third engagement clutch C3) is engaged when the vehicle is stopped. Accordingly, it is possible to achieve vehicle starting with good response to a starting request while suppressing starting shock when there is a starting request. In addition, even when carrying out an operation that passes the neutral range (N range) or an operation for selecting the neutral range (N range) in a vehicle stopped state on a sloped road, it is possible to prevent the vehicle from sliding down.

(2) The transmission (multistage gear transmission 1) has starting gear shift stages ("EV1st", "EV2nd") in which the start clutch (MG1 1st clutch, MG1 2nd clutch) is engaged, and when there is a selection operation from a traveling range (D range) to a parking range (P range) or a neutral range (N range) when a vehicle is stopped, the starting controller (transmission control unit 23, FIG. 5) maintains the starting gear shift stage ("EV1st," "EV2nd") when the vehicle is stopped, until the next time that the traveling range (D range) is selected. Accordingly, in addition to the effect of (1), even when there is a request for a quick start from the parking range (P range) or the neutral range (N range), the time required from a selection operation to the traveling range (D range) to the starting of the vehicle is reduced.

(3) The transmission is a multistage transmission (multistage gear transmission 1) having a first gear stage ("EV1st") in which a first start clutch (MG1 1st clutch) is engaged and a second gear stage ("EV2nd") in which a second start clutch (MG1 2nd clutch) is engaged, and when a downshift control from the second gear stage ("EV2nd") to the first gear stage ("EV1st") is started during deceleration before the vehicle stops, and the downshift to the first gear stage ("EV1st") is completed at the time of the vehicle stop, if there is a selection operation from the traveling range (D range) to the parking range (P range) or the neutral range (N range) in a vehicle stopped state, the starting controller (transmission control unit 23, FIG. 5) maintains the first gear stage ("EV1st") after the downshift until the next time that the traveling range (D range) is selected (S5→S6→S7→S8). Accordingly, in addition to the effect of (2), when the downshift to the first gear stage ("EV1st") is completed at the time of the vehicle stop, an EV start by the first gear stage ("EV1st") with a high start drive performance can be secured with respect to the next starting request.

(4) The transmission is a multistage transmission (multistage gear transmission 1) having a first gear stage ("EV1st") in which a first start clutch (MG1 1st clutch) is engaged and a second gear stage ("EV2nd") in which a second start clutch (MG1 2nd clutch) is engaged, and when a downshift control from the second gear stage ("EV2nd") to the first gear stage ("EV1st") is started during deceleration before the vehicle stops, and the downshift to the first gear stage ("EV1st") is not completed at the time of the vehicle stop, it is returned to the second gear stage ("EV2nd") before the downshift, and if there is a selection operation from the traveling range (D range) to the parking range (P range) or the neutral range (N range) when the vehicle is stopped, the starting controller (transmission control unit 23, FIG. 5) maintains the second gear stage ("EV2nd") to which it is returned, until the next time the traveling range (D range) is selected (S5→S11→S12→S13→S14). Accordingly, in addition to the effect of (2), when the downshift to the first gear stage ("EV1st") is not completed at the time of the vehicle stop, an EV start by the second gear stage ("EV2nd") can be secured with respect to the next starting request.

(5) The transmission (multistage gear transmission 1) has starting gear shift stages ("EV1st," "EV2nd") in which the start clutch (MG1 1st clutch and MG1 2nd clutch of the third engagement clutch C3) is engaged, and if a selection operation to another range (P, N range) is not carried out maintaining the traveling range (D range) when the vehicle is stopped, the starting controller (transmission control unit 23, FIG. 5) restarts the vehicle by the starting gear shift stage ("EV1st" or "EV2nd") (S6→S10, S12→S16). Accordingly, in addition to the effects of (1) to (4), the time required from a starting request operation to a restart is reduced, with respect to a request for a quick restart in which a selection operation is not carried out.

(6) The electrically driven vehicle is a hybrid vehicle comprising an electric motor (first motor/generator MG1, second motor/generator MG2) and an internal combustion engine ICE as power sources, wherein the transmission is a multistage gear transmission 1 comprising an engagement clutch (third engagement clutch C3) that selects an EV first gear stage ("EV1st") when a movement direction of the coupling sleeve 53 from the neutral position (N position) is in one direction, and selects an EV second gear stage ("EV2nd") when in another direction, and carries out an EV start by not having a differential rotation absorbing element. Accordingly, in addition to the effects of (1) to (5), upon an EV start in a hybrid vehicle, an EV start selecting the "EV1st" or "EV2nd" gear shift pattern having a common coupling sleeve 53 is secured.

Second Embodiment

The second embodiment is an example in which the starting control device is applied to an electrically driven vehicle instead of the hybrid vehicle of the first embodiment.

The configuration is described first. The starting control device of the second embodiment is applied to an electrically driven vehicle (one example of an electrically driven vehicle), comprising, as drive system components, one motor/generator and a two speed gear transmission having one engagement clutch. The "overall system configuration" of the device for controlling starting of an electrically driven vehicle in the second embodiment will be described below.

Overall System Configuration

Figure 10:
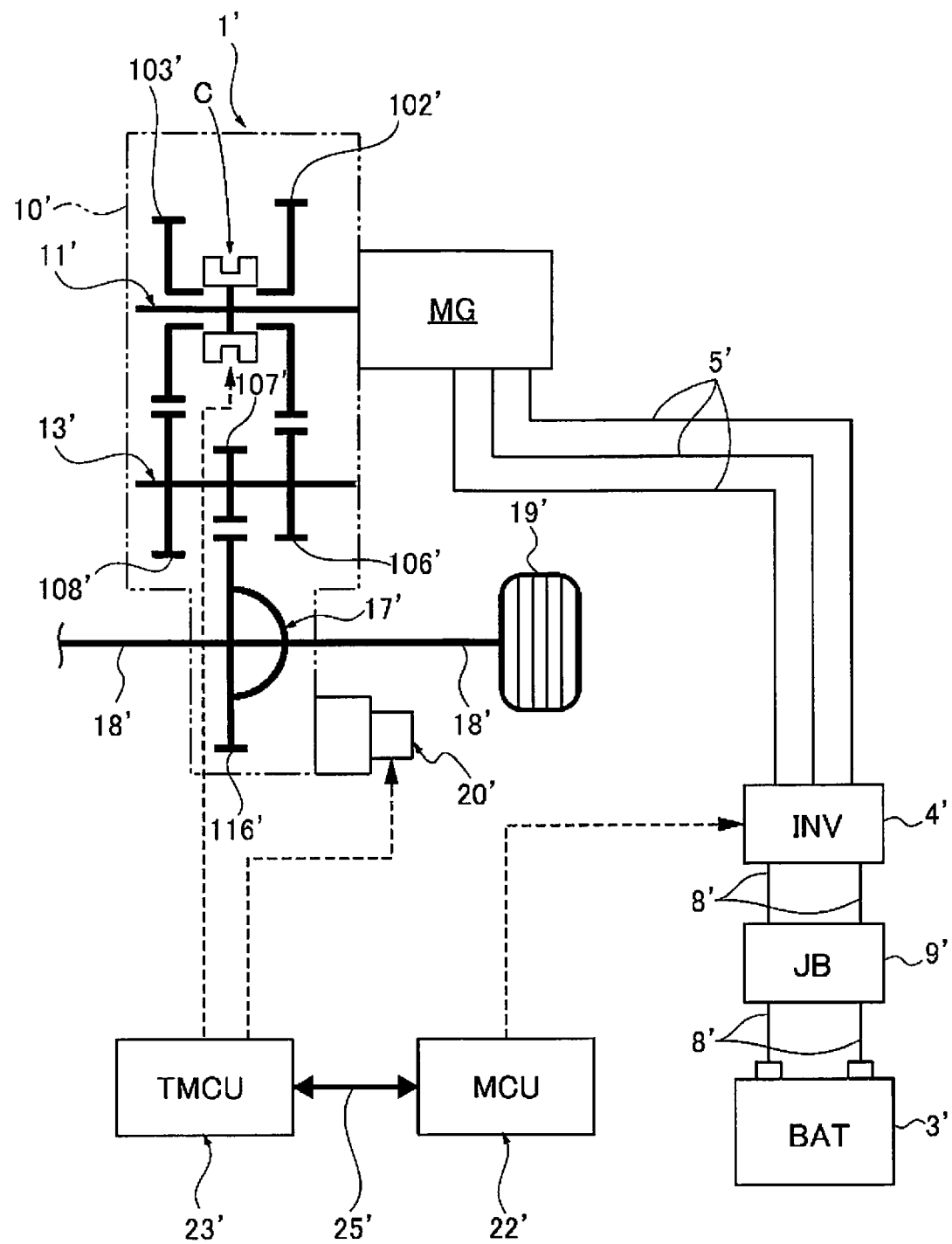
FIG. 10 is an overall system view illustrating a drive system and a control system of an electrically driven vehicle to which is applied the starting control device of a second embodiment.

FIG. 10 illustrates a drive system and a control system of an electrically driven vehicle to which is applied the starting control device of the second embodiment. The overall system configuration will be described below, based on FIG. 10.

The drive system of the electrically driven vehicle comprises a motor/generator MG and a two-speed gear transmission 1' having one engagement clutch C, as illustrated in FIG. 10.

The motor/generator MG is a permanent magnet type synchronous motor utilizing a three-phase alternating current, having a high power battery 3' as a power source. The stator of the motor/generator MG is fixed to a case of the motor/generator MG, and the case is fixed to a transmission case 10' of the two speed gear transmission 1'. Then, a motor shaft integrated to a rotor of the motor/generator MG is connected to a first shaft 11' of the two speed gear transmission 1'. An inverter 4', which converts direct current to three-phase alternating current during powering and converts three-phase alternating current to direct current during regeneration, is connected to a stator coil of the motor/generator MG, via an AC harness 5'. The high power battery 3' and the inverter 4' are connected by a DC harness 8', via a junction box 9'.

The two-speed gear transmission 1' is a normally meshing transmission comprising two gear pairs having different transmission ratios, and comprises two gear shafts provided with gears and disposed parallel to each other inside the transmission case 10', and one engagement clutch C for selecting a gear pair. A first shaft 11' and a third shaft 13' are provided as gear shafts.

The first shaft 11' is a shaft to which the motor/generator MG is connected, and a second gear 102' and a third gear 103' are disposed to the first shaft 11', in order from the right side in FIG. 10. The second gear 102' and the third gear 103' are idling gears, in which boss portions protruding in the axial direction are inserted onto the outer perimeter of the first shaft 11', and are provided so as to be drivably connectable to the first shaft 11' via the engagement clutch C.

The third shaft 13' is disposed on the output side of the two-speed gear transmission 1', and a sixth gear 106', a seventh gear 107', and an eighth gear 108' are disposed on the third shaft 13', in order from the right side in FIG. 10. The sixth gear 106', the seventh gear 107', and the eighth gear 108' are integrally provided (including integral fixing) on the third shaft 13'. Then, the sixth gear 106' meshes with the second gear 102' of the first shaft 11', the seventh gear 107' meshes with a sixteenth gear 116' of a differential gear 17', and the eighth gear 108' meshes with the third gear 103' of the first shaft 11'.

The engagement clutch C is a dog clutch interposed between the second gear 102' and the third gear 103' of the first shaft 11', and is engaged by an engagement stroke in a rotation synchronization state, by not having a synchronizing mechanism. When the engagement clutch C is in a left engagement position (Left), the first shaft 11' and the third gear 103' are drivingly connected. When the engagement clutch C is in a neutral position (N), the first shaft 11' and the second gear 102' are released, and the first shaft 11' and the third gear 103' are released. When the engagement clutch C is in a right engagement position (Right), the second gear 102' and the first shaft 11' are drivingly connected. Then, a sixteenth gear 116' that meshes with the seventh gear 107' provided on the third shaft 13' of the two-speed gear transmission 1' is connected to left and right drive wheels 19' via the differential gear 17', and left and right drive shafts 18'.

The control system of the electrically driven vehicle comprises a motor control unit 22' and a transmission control unit 23', as illustrated in FIG. 10. The motor control unit 22' and the transmission control unit 23' are connected so as to be capable of bidirectional information exchange by a CAN communication line 25'.

The motor control unit 22' (abbreviation: "MCU") carries out powering control, regeneration control, and the like, of the motor/generator MG by control commands to the inverter 4'.

The transmission control unit 23' (abbreviation: "TMCU") carries out a shift control for switching the gear shift stage of the two-speed gear transmission 1', by outputting a current command to an electric actuator, which is not shown, based on predetermined input information. In this shift control, the engagement clutch C is selectively mesh engaged/released to correspond with the third engagement clutch C3 of the first embodiment, and a gear pair involved in power transmission is selected from the two gear pairs. A low gear shift stage (selection of the gear pair comprising the third gear 103' and the eighth gear 108') and a high gear shift stage (selection of the gear pair comprising the second gear 102' and the sixth gear 106') are thereby obtained.

Regarding the "configuration of the shift control system" in the device for controlling starting of an electrically driven vehicle according to the second embodiment, the engagement clutch C becomes one configuration of the first embodiment shown in FIG. 2. Regarding the "configuration of the gear shift patterns," the configuration is such that a "low gear shift stage" and a "high gear shift stage" are switched via the neutral position. Regarding the "configuration of the starting control process," the configuration is such that the "EV1st" and the "EV2nd" in the configuration of the first embodiment shown in FIG. 5 are respectively changed to "low gear shift stage" and "high gear shift stage."

The effects listed below can be obtained by the device for controlling starting of an electrically driven vehicle according to the second embodiment.

(7) The electrically driven vehicle is an electric automobile comprising only an electric motor (motor/generator MG) as a power source, wherein the transmission is a two-speed gear transmission 1' comprising an engagement clutch C that selects a "low gear shift stage" when a movement direction of a coupling sleeve from a neutral position (N position) is in one direction, and selects a "high gear shift stage" when in another direction. Accordingly, in addition to the effects of (1) to (5) described above, it is possible to secure a start by selecting a "low gear shift stage" or a "high gear shift stage" having a common coupling sleeve when starting with an electrically driven vehicle, while simplifying the configuration of the transmission (two speed gear transmission 1')

The device for controlling starting of an electrically driven vehicle of the present invention was described above based on the first embodiment and the second embodiment, but specific configurations thereof are not limited to these embodiments, and various modifications and additions to the design can be made without departing from the scope of the invention according to each claim in the claims.

In the first and second embodiments, an example was shown in which, when a down-shift control from "EV2nd" to "EV1st" is started during deceleration, a starting controller (FIG. 5) determines whether or not the downshift to "EV1st" is completed at the time of the vehicle stopping. However, when a downshift control from "EV2nd" to "EV1st" is started during deceleration, the starting controller may input position information of the coupling sleeve at the time of the vehicle stop to determine whether the position is close to the engagement position of "EV2nd" or close to the engagement position of "EV1st." Then, the starting controller may select the closer gear shift pattern, and selectively cause the coupling sleeve to move to set the gear shift pattern to "EV1st," or "EV2nd."

In the first embodiment, an example was shown in which the transmission comprises three engagement clutches C1, C2 and C3, and is a normally meshing multistage gear transmission 1 having a plurality of gear pairs with different transmission ratios. In the second embodiment, an example was shown in which the transmission comprises one engagement clutch C, and is a normally meshing two-speed gear transmission 1' having two gear pairs with different transmission ratios. However, the transmission is not limited to the multistage gear transmission 1 or the two-speed gear transmission 1' shown in the first and second embodiments, and may be any transmission that achieves at least one gear shift stage, and that has, as a shifting element, an engagement clutch that meshes and engages due to movement from a disengaged position.

In the first embodiment, an example was shown in which the starting control device of the present invention is applied to a hybrid vehicle comprising, as drive system components, one engine, two motor/generators, and a multistage gear transmission having three engagement clutches. In the second embodiment, an example was shown in which the starting control device of the present invention is applied to an electrically driven vehicle comprising, as drive system components, one motor/generator and a two speed gear transmission having one engagement clutch. However, the starting control device of the present invention may be applied to electrically driven vehicles such as other types of hybrid vehicles, electrically driven vehicles, and fuel cell vehicles, as long as the electrically driven vehicle comprises, in the drive system, an electric motor as a power source, and a transmission having at least one engagement clutch.

The invention claimed is:

1. An electrically driven vehicle start control device for controlling a starting of an electrically driven vehicle having a drive system that includes an electric motor as a power source and a transmission that converts an output from the electric motor and transmits the output to a drive wheel, in which the transmission has a plurality of engagement clutches as shifting elements that meshingly engage by movement from a disengaged position, the plurality of engagement clutches including a start clutch that is meshingly engaged in response to a starting request to connect the electric motor and the drive wheel, the electrically driven vehicle start control device comprising:
   a starting controller programmed to maintain engagement of the start clutch, if the start clutch is engaged when the vehicle is in a stopped state, for a duration including the stopped state and until a next starting request,
   the transmission having at least one starting gear shift stage in which the start clutch is engaged, and
   upon a selection operation from a traveling range to a parking range or a neutral range while the vehicle is in the stopped state, the starting controller being further programmed to maintain the at least one starting gear shift stage until a next time that the traveling range is selected.

2. The electrically driven vehicle start control device according to claim 1, wherein
   the transmission has a first gear stage in which a first start clutch of the start clutch is engaged and a second gear stage in which a second start clutch of the start clutch is engaged, and
   when a downshift control is started from the second gear stage to the first gear stage during deceleration before the vehicle stops, and the downshift control to the first gear stage is completed at the time the vehicle stops, the starting controller is configured to maintain the first gear stage after the downshift until the next time that the traveling range is selected upon the selection operation from the traveling range to the parking range or the neutral range in a stopped vehicle.

3. The electrically driven vehicle start control device according to claim 2, wherein
   upon the selection operation from the traveling range to the parking range or the neutral range when the vehicle is in the stopped state, the starting controller is configured to restart the vehicle with the at least one starting gear shift stage.

4. The electrically driven vehicle start control device according to claim 2, wherein
   the electrically driven vehicle is a hybrid vehicle comprising the electric motor and an internal combustion engine as power sources, and
   the transmission is a multistage gear transmission comprising the start clutch that selects an EV first gear stage when a movement direction of a coupling sleeve from a neutral position is in one direction, and selects an EV second gear stage when in another direction, and carries out an EV start by not having a differential rotation absorbing element.

5. The electrically driven vehicle start control device according to claim 2, wherein
the electrically driven vehicle is an electric automobile comprising only the electric motor as the power source, and
the transmission is a two-speed gear transmission comprising the start clutch that selects a low gear shift stage when a stroke direction of a coupling sleeve from a neutral position is in one direction, and selects a high gear shift stage when in another direction.

6. The electrically driven vehicle start control device according to claim 1, wherein
the transmission has a first gear stage in which a first start clutch of the start clutch is engaged and a second gear stage in which a second start clutch of the start clutch is engaged, and
when a downshift control is started from the second gear stage to the first gear stage during deceleration before the vehicle stops, and the downshift control to the first gear stage is not completed at a time the vehicle stops, the starting controller is configured to return to the second gear stage and maintains the second gear stage, until the next time that the traveling range is selected upon the selection operation from the traveling range to the parking range or the neutral range when the vehicle is stopped.

7. The electrically driven vehicle start control device according to claim 6, wherein
upon the selection operation from the traveling range to the parking range or the neutral range when the vehicle is in the stopped state, the starting controller is configured to restart the vehicle with the at least one starting gear shift stage.

8. The electrically driven vehicle start control device according to claim 6, wherein
the electrically driven vehicle is a hybrid vehicle comprising the electric motor and an internal combustion engine as power sources, and
the transmission is a multistage gear transmission comprising the start clutch that selects an EV first gear stage when a movement direction of a coupling sleeve from a neutral position is in one direction, and selects an EV second gear stage when in another direction, and carries out an EV start by not having a differential rotation absorbing element.

9. The electrically driven vehicle start control device according to claim 6, wherein
the electrically driven vehicle is an electric automobile comprising only the electric motor as the power source, and
the transmission is a two-speed gear transmission comprising the start clutch that selects a low gear shift stage when a stroke direction of a coupling sleeve from a neutral position is in one direction, and selects a high gear shift stage when in another direction.

10. The electrically driven vehicle start control device according to claim 1, wherein
upon the selection operation from the traveling range to the parking range or the neutral range when the vehicle is in the stopped state, the starting controller is configured to restart the vehicle with the at least one starting gear shift stage.

11. The electrically driven vehicle start control device according to claim 10, wherein
the electrically driven vehicle is a hybrid vehicle comprising the electric motor and an internal combustion engine as power sources, and
the transmission is a multistage gear transmission comprising the start clutch that selects an EV first gear stage when a movement direction of a coupling sleeve from a neutral position is in one direction, and selects an EV second gear stage when in another direction, and carries out an EV start by not having a differential rotation absorbing element.

12. The electrically driven vehicle start control device according to claim 10, wherein
the electrically driven vehicle is an electric automobile comprising only the electric motor as the power source, and
the transmission is a two-speed gear transmission comprising the start clutch that selects a low gear shift stage when a stroke direction of a coupling sleeve from a neutral position is in one direction, and selects a high gear shift stage when in another direction.

13. The electrically driven vehicle start control device according to claim 1, wherein
the electrically driven vehicle is a hybrid vehicle comprising the electric motor and an internal combustion engine as power sources, and
the transmission is a multistage gear transmission comprising the start clutch that selects an EV first gear stage when a movement direction of a coupling sleeve from a neutral position is in one direction, and selects an EV second gear stage when in another direction, and carries out an EV start by not having a differential rotation absorbing element.

14. The electrically driven vehicle start control device according to claim 1, wherein
the electrically driven vehicle is an electric automobile comprising only the electric motor as the power source, and
the transmission is a two-speed gear transmission comprising the start clutch that selects a low gear shift stage when a stroke direction of a coupling sleeve from a neutral position is in one direction, and selects a high gear shift stage when in another direction.

* * * * *